United States Patent [19]
Garner et al.

[11] Patent Number: 6,065,664
[45] Date of Patent: May 23, 2000

[54] METHOD OF INSTALLING HEAT PIPES USING INTERNAL VAPOR PRESSURE

[75] Inventors: Scott D. Garner, Lititz; Douglas W. Grove, Mount Joy, both of Pa.

[73] Assignee: Thermal Corp., Georgetown, Del.

[21] Appl. No.: 09/131,528

[22] Filed: Aug. 10, 1998

[51] Int. Cl.[7] .......................... B21D 39/04; B21D 39/08; B21D 53/02; B23K 31/02; B23P 11/02
[52] U.S. Cl. .......................... 228/126; 228/127; 228/131; 228/233.2; 228/234.1; 228/234.2; 29/447; 29/890.044
[58] Field of Search .................... 228/127, 131, 228/132, 233.2, 234.2, 234.1, 120, 183, 157; 29/890.044, 447; 361/700

[56] References Cited

U.S. PATENT DOCUMENTS

| | | | |
|---|---|---|---|
| 3,762,032 | 10/1973 | Bowling et al. | 29/493 |
| 5,088,007 | 2/1992 | Missele | 361/386 |
| 5,412,535 | 5/1995 | Chao et al. | 29/890.032 |
| 5,461,766 | 10/1995 | Burward-Hoy | 29/447 |
| 5,564,184 | 10/1996 | Dinh | 29/890.044 |
| 5,611,944 | 3/1997 | Gilkinson et al. | 219/117.1 |
| 5,699,853 | 12/1997 | Goth et al. | 165/104.21 |

*Primary Examiner*—Patrick Ryan
*Assistant Examiner*—Zidia T. Pittman
*Attorney, Agent, or Firm*—Martin Fruitman

[57] ABSTRACT

The disclosure is for a method of installing a heat pipe within another structure. A completely processed heat pipe is coated with solder and inserted into a cylindrical hole within the structure with sliding clearance. The casing of the heat pipe is then expanded into tight contact with the surrounding hole by heating the heat pipe and expanding the heat pipe casing with the heat pipe's own internal vapor pressure. The application of heat also simultaneously melts the solder to bond the heat pipe into the hole.

5 Claims, 1 Drawing Sheet

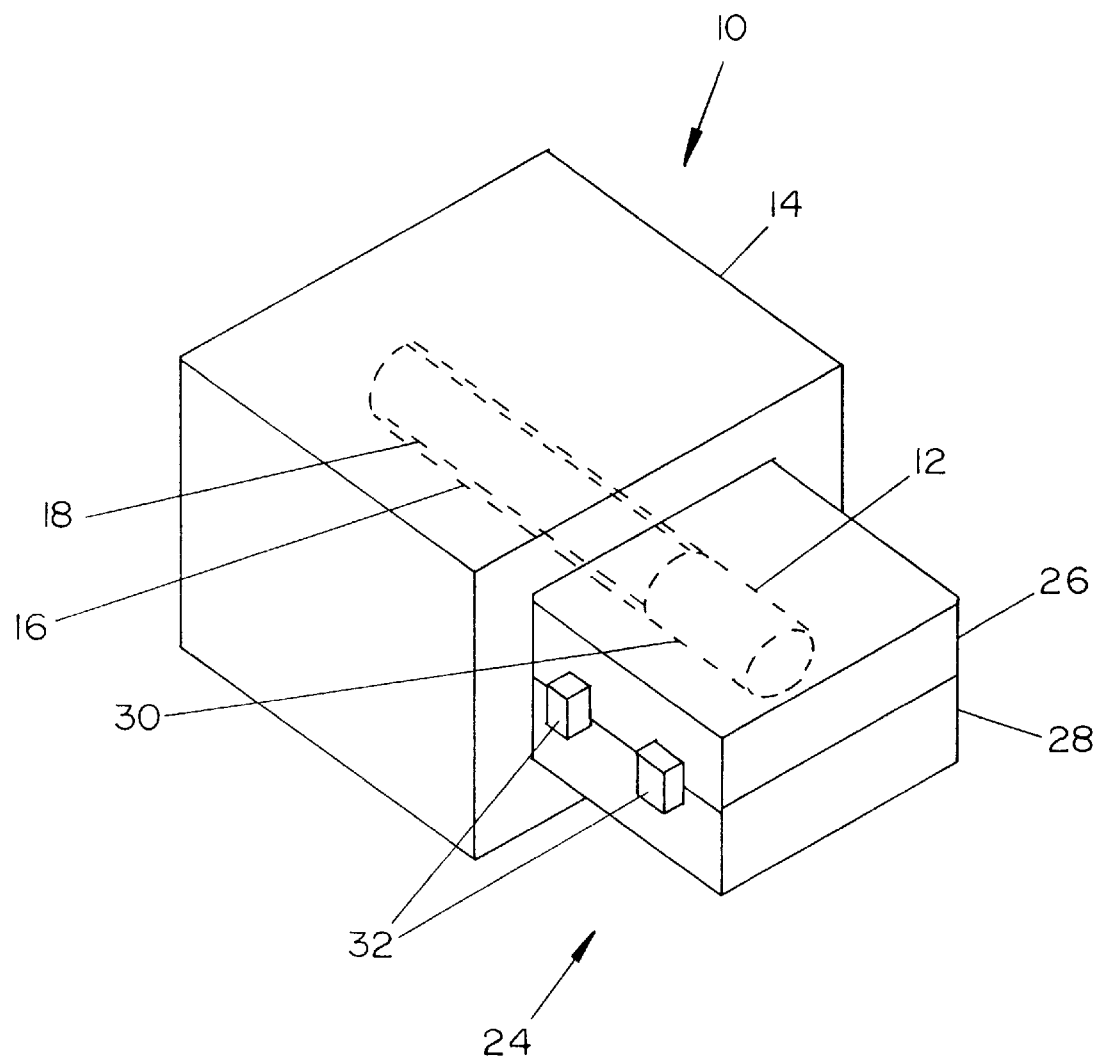

METHOD OF INSTALLING HEAT PIPES USING INTERNAL VAPOR PRESSURE

BACKGROUND OF THE INVENTION

This invention deals generally with a method of assembling heat pipes into larger structures, and more specifically with a method of maintaining good thermal contact between a heat pipe and an assembly into which it is placed.

Expanding a heat pipe casing into contact with a surrounding assembly is not new. The method has been suggested in the patent literature many times, particularly as a method of attaching one or more fins to the outside of a heat pipe casing. For example, U.S. Pat. No. 5,412,535 by Chao et al suggests just such a method by either pulling a mandrel through the tube which will become the casing or by expanding the tube with hydraulic pressure. However, what may not be appreciated about such techniques is that they require the subsequent manufacture of the tubing into an operating heat pipe. That means that the entire assembly must undergo the processing of the heat pipe, and thus the materials of the entire assembly must be compatible with the procedure of processing the heat pipe. This may mean making compromises between the choice of materials and the processing techniques. Furthermore, even with compatible materials, a much larger assembly must be processed, and it also means that any failure during the manufacture of the heat pipe causes the loss of an entire assembly instead of just a single heat pipe.

SUMMARY OF THE INVENTION

The present invention is for a method of expansion of heat pipe casings which counteracts the problems of assembly materials which are not compatible with the materials of the heat pipe, and permits the complete manufacture and testing of the heat pipe before it is joined with a larger assembly.

The method essentially involves using a completely processed and tested heat pipe, one that has been verified as operable at the required conditions. It is even practical to use heat pipes which have been operated for a substantial period of testing time to assure that there are no early failures. The outer surface of such a completed heat pipe is then coated with a layer of solder and inserted into a hole in the larger assembly, with the hole dimensioned to afford sliding clearance for the coated heat pipe.

The entire assembly, including the heat pipe is then heated to a temperature high enough to cause the internal vapor pressure of the heat pipe to increase to a point at which the pressure expands the heat pipe casing into tight contact with the inside surface of the hole surrounding the heat pipe. Furthermore, the temperature and the solder are selected so that the solder is melted at the maximum attained processing temperature.

The result is that, when the assembly is cooled, the heat pipe has been expanded and soldered into intimate thermal contact with the structure within which it is mounted.

BRIEF DESCRIPTION OF THE DRAWING

The FIGURE is a perspective view of a heat pipe inserted into a structure as it is being subjected to high temperature to increase the internal vapor pressure.

DETAILED DESCRIPTION OF THE INVENTION

The FIGURE is a perspective view of assembly 10 with heat pipe 12 inserted into structure 14 at hole 16 as assembly 10 is being assembled by the method of the invention. The simple procedure involves heating assembly 10 to a high enough temperature to cause the internal vapor pressure of heat pipe 12 to exceed the normal operating limits of the heat pipe and to deform heat pipe 12 into a tight thermal contact with structure 14.

A further benefit is that the heat to which heat pipe 12 is subjected can also be used to solder heat pipe 12 into structure 14. This method is described below.

A. Coat the portion of heat pipe 12 which is to be inserted. into structure 14 with solder 18.

B. Insert the coated portion of heat pipe 12 into clearance hole 16 within structure 14 to which heat pipe 12 is to be attached;

C. Raise the temperature of the complete assembly 10 above the maximum operating temperature of heat pipe 12 and to a temperature which is sufficient to increase the vapor pressure within heat pipe 12 to a point at which the internal vapor pressure expands heat pipe 12 into contact with hole 16 and also to a temperature at which solder 18 melts.

D. Reduce the temperature to which heat pipe 12 is subjected so that solder 18 hardens.

The resulting assembly 10 maintains excellent thermal contact between heat pipe 12 and structure 14 throughout the entire range of operating temperatures of assembly 10.

Since there may be portions of heat pipe 12 which are external to structure 14, for instance those which are later to be installed into other devices, it may be necessary to protect those portions of heat pipe 12 from expansion. This can be accomplished simply by installing clamp 24 around the portion of heat pipe 12 external to structure 14. Clamp 24 is quite conventional in that it has two sections 26 and 28, each with a groove 30 which matches the other groove, and latching devices 32 to hold sections 26 and 28 together. Grooves 30 are dimensioned to fit tightly around the unexpanded dimensions of heat pipe 12. Clamp 24 thereby prevents the portions of heat pipe 12 which are within clamp 24 from expanding along with the portion of heat pipe 12 within structure 14.

The method of the invention can also be used to install heat pipe 12 into more than one structure. Such a second structure can be attached anywhere else along heat pipe 12 and processed simultaneously with structure 14. However, if installation is to be made independently from the attachment to structure 14, the only adjustment required is that the solder of the second installation melt at a temperature lower than the melting temperature of solder 18 of the first installation. The subsequent increase of vapor pressure will, of course, not have any effect on the portion of heat pipe 12 already installed into structure 14, since that portion of heat pipe 12 is prevented from further expansion because it is restrained by the interior of hole 16.

Another variation of the invention is to completely eliminate solder 18 so that the connection between heat pipe 12 and structure 14 is a simple force fit. It is also possible to use a conformable but non-bonding heat conductive material in place of solder 18. When solder 18 is replaced by, for instance, a layer of copper mat, similar in appearance to steel wool, the expansion of heat pipe 12 compresses the copper mat and forms a heat conductive layer between the heat pipe and the asembly into which it is being assembled.

In the preferred embodiment of the invention the structures and materials are listed below.

Heat pipe 12 is constructed with a copper tubing casing of any length with a wall thickness of 0.020 inch, an outside diameter of 0.25 inch, and water as the heat transfer fluid.

Structure 14 is typically an aluminum heat sink.

Solder 18 is tin plating applied to the outside cylindrical surface of heat pipe 12 to a thickness of 0.0005 to 0.001 inch.

The temperature to which heat pipe 12 and heat sink 14 are raised to expand heat pipe 12 and melt solder 18 is 315 degrees centigrade. This temperature is attained in a conventional soldering oven in an atmosphere of air.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, other materials and dimensions could be used for heat pipe 12 along with different heat transfer fluids, and therefore different maximum temperatures would be required to attain the vapor pressure required for expansion. Furthermore, other types of interface materials such as plating, epoxy, or solder can be used in place of solder 18 whether or not they are melted or cured as a result of the higher applied temperature.

What is claimed as new and for which letters patent of the united states are desired to be secured is:

1. A method of assembling a heat pipe into a structure comprising:

inserting a portion of a heat pipe (12) into a clearance hole (16) within a structure (14) to which the heat pipe (12) is to be attached; and raising the temperature of the heat pipe (12) and the structure (14) above the maximum operating temperature of the heat pipe (12), to a temperature which is sufficient to increase the vapor pressure within the heat pipe (12) to a point at which the internal vapor pressure expands the heat pipe (12) into contact with the hole (16).

2. The method of claim 1 further including:

first coating the portion of the heat pipe (12) which is to be inserted into the structure (14) with solder (18) before inserting the heat pipe (12);

raising the temperature of the heat pipe (12) and the structure (14) to a temperature at which the solder (18) melts; and after the solder (18) has melted, reducing the temperature to which the heat pipe (12) and the structure (14) are subjected so that the solder (18) hardens.

3. The method of claim 1 further including:

prior to raising the temperature of the heat pipe (12), supporting the portions of the heat pipe (12) which are not inserted into any structure so that those uninserted portions are prevented from expanding.

4. The method of claim 1 further including:

inserting an intermediate material (18) between the heat pipe (12) and the structure (14) before expanding the heat pipe (12).

5. The method of claim 1 further including:

inserting an intermediate material (18) which hardens with applied heat between the heat pipe (12) and the structure (14) before expanding the heat pipe (12).

* * * * *